April 26, 1927.
F. BJORKLUND
POWER OPERATED HANDSAW
Filed Oct. 2, 1925
1,626,503
3 Sheets-Sheet 1
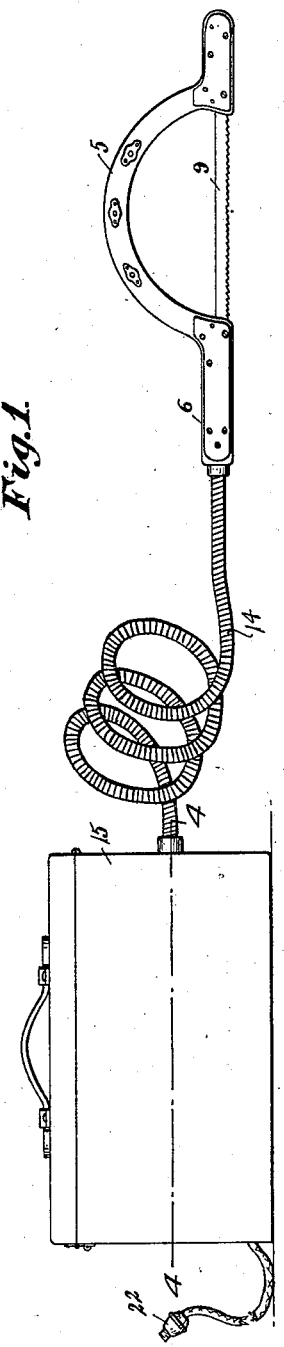
Fig.1
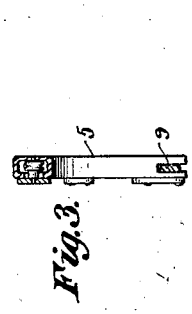
Fig.3
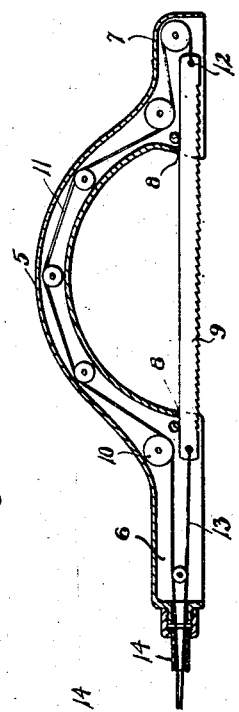
Fig.2
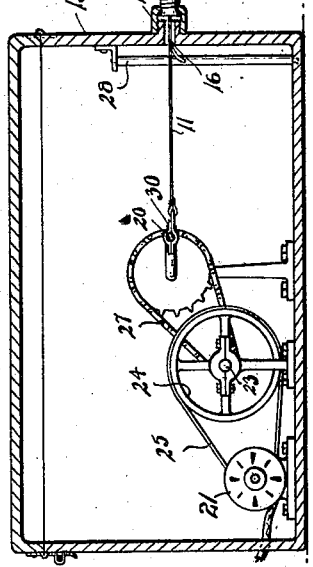
Fig.2ᴬ
Felix Bjorklund,
INVENTOR
BY *Victor J. Evans,*
ATTORNEY
WITNESS:

April 26, 1927.
F. BJORKLUND
POWER OPERATED HANDSAW
Filed Oct. 2, 1925
1,626,503
3 Sheets-Sheet 2
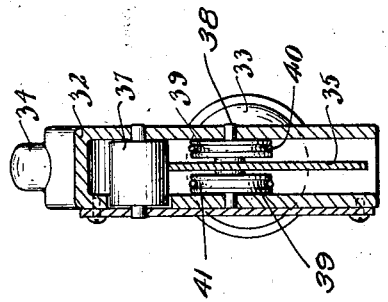
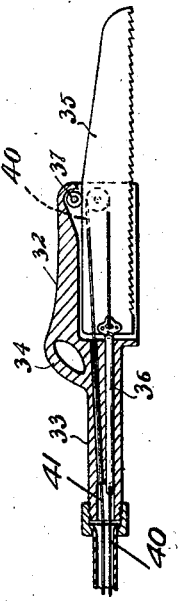
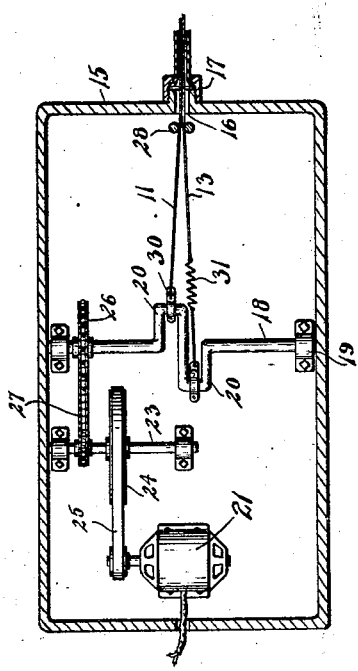
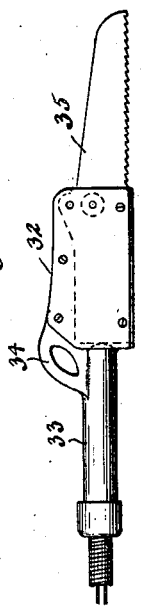
Felix Bjorklund,
INVENTOR April 26, 1927.  F. BJORKLUND  1,626,503
POWER OPERATED HANDSAW
Filed Oct. 2, 1925    3 Sheets-Sheet 3
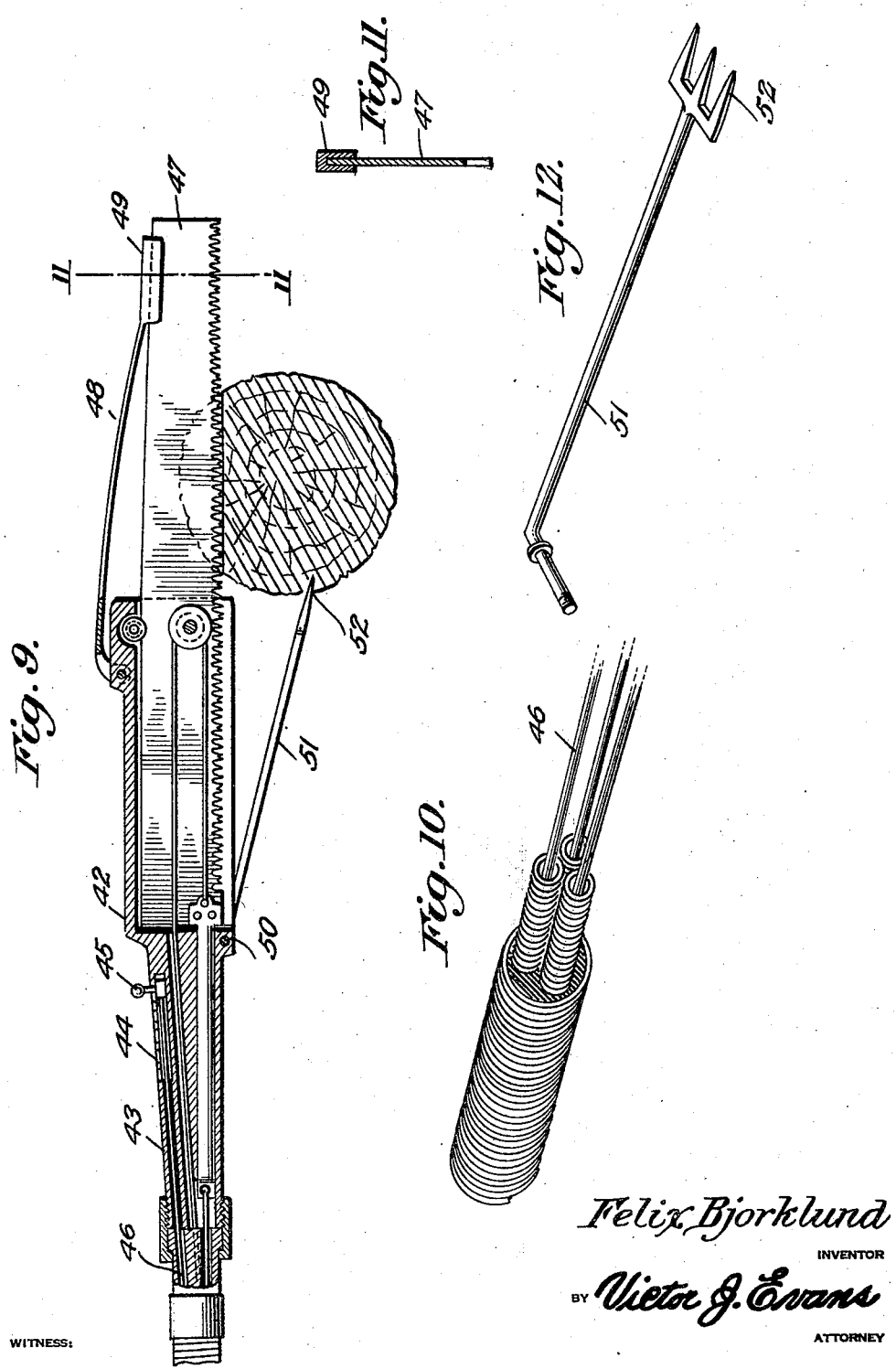
Felix Bjorklund
INVENTOR
BY Victor J. Evans
ATTORNEY
WITNESS:

Patented Apr. 26, 1927.

1,626,503

UNITED STATES PATENT OFFICE.

FELIX BJORKLUND, OF FAIRPORT HARBOR, OHIO.

POWER-OPERATED HANDSAW.

Application filed October 2, 1925. Serial No. 60,104.

My invention relates to power operated hand saws and its principal object is to provide a reciprocable saw which is mounted on a portable base and actuated from the latter.

The invention contemplates a casing wherein a motor and operating mechanism is housed together with a reciprocating saw element or other tool associated therewith.

My invention also provides a saw or other tool which can be conveniently carried from place to place and connected with an electrical supply to operate a mechanism which in turn reciprocates the saw or other tool.

With the preceding and other objects and advantages in mind, the invention consists in the novel combination of elements, construction and arrangement of parts and operations to be hereinafter more specifically referred to, claimed and illustrated in the accompanying drawings, wherein:—

Figure 1 is an elevation of a saw constructed in accordance with my invention.

Figure 2 is a vertical sectional view of the saw proper.

Fig. 2ᴬ is a vertical sectional view taken through the casing which houses the operating mechanism for the saw.

Figure 3 is a transverse sectional view of the saw proper.

Figure 4 is a horizontal sectional view taken on line 4—4 of Figure 1.

Figure 5 is a detail elevation of a modified form of the invention.

Figure 6 is a side elevation of the same.

Figure 7 is a sectional view of the form of the invention shown in Figures 5 and 6.

Figure 8 is a vertical sectional view therethrough.

Figure 9 is a longitudinal sectional view through another modified form.

Figure 10 is a fragmentary perspective view of the cable for the form shown in Figures 9 to 12.

Figure 11 is a sectional view taken on the line 11—11 of Figure 9.

Figure 12 is a detail view of the log holding means for the modified form as shown in Figures 9 to 12.

Referring to the drawings in detail wherein corresponding characters of reference denote corresponding parts throughout the several views, and particularly to Figures 1 to 4 inclusive, the numeral 5 designates a tubular saw arbor frame which is formed with horizontal extensions 6 and 7 at its ends and which are open at their bottoms and provided with openings 8 upon their inner ends. Movable back and forth across the arbor 5 and in the extensions 6 and 7 is a saw blade 9, the latter passing through the openings 8 as shown. Arranged in the extensions 6 and 7 and arbor 5 is a plurality of guide pulleys 10 about which a flexible operating element 11 is trained, the latter passing around the endmost pulley 10, the housing 7 and attached to the forward end of the saw blade as shown at 12. A second flexible element 13 is attached directly to the opposite end of the blade 9. Both flexible elements 11 and 13 extend through a flexible tube 14 which is attached to an operating mechanism to be hereinafter specifically referred to.

The numeral 15 designates a rectangular casing having an opening 16 in its front wall directly in alinement with a coupling 17 which couples the flexible tube 14 to this front wall. A crank shaft 18 is journaled in bearings 19 within the casing 15 and includes a pair of oppositely extending throws 20. An electric motor 21 is mounted within the casing 15 and is operated by connecting a plug 22 with a suitable electric fixture of a source of electric energy. A drive shaft 23 is also arranged in the casing 15 between the motor 21 and the crank shaft 18 and is provided with a pulley 24, the latter being driven by a belt 25 engaged with the rotatable part of the motor. The shaft 23 and the crank shaft 18 are each provided with sprocket wheels 26 which are operatively connected together by a sprocket chain 27.

The flexible elements 13 and 11 pass through the openings 16 and between a pair of vertically arranged spaced guide pins 28 and are connected to collars 30 fixed to the throws 20 of the crank shaft 18. A contractile spring 31 is interposed in the cable 13 to relieve the saw blade of sudden jerks or strain incident to the operation of the same.

In the modification shown in Figures 6 to 8 inclusive, I provide a channel-shaped casting 32 having a rearwardly extending tubular extension 33 and a hand grip 34 cast integral therewith. A reciprocable saw blade is designated at 35 and attached thereto is a shank 36 slidably mounted in the tube 33. An anti-friction roller 37 is journaled at the upper end of the casting 32 and contacts with the upper edge of the saw blade 35.

Arranged upon opposite sides of the saw blade 35 and journaled on pins 38 in the side walls of the casting 32 are spaced rollers 39. In this form of the invention each of the flexible elements 11 has secured thereto looped elements 40 and 41 which are trained about the pulleys 39 as suggested in Figure 7 of the drawings. In this form of the invention, the saw 32 is reciprocated through the instrumentality of the same mechanism as that form of the invention shown in Figures 1 to 4, inclusive.

In Figures 9 to 12, inclusive, I have illustrated another modification of the invention, and I have provided a means for controlling saw adjacent the same, and in this last modified form the casting is indicated by the reference numeral 42 which is somewhat similar to the casing 32. However, it will be noted that the casting 42 is formed with a bore 43 slightly enlarged as at 44 to accommodate a slidable control element 45 which has secured thereto a cable 46 adapted to be associated with a switch or other similar element (not shown) to control a driving motor or the like of similar structure as shown in Figure 4.

The saw 47 is operated in exactly the same manner as the saw 35, but in this instance there is secured to the casting 42 at a point adjacent its outer end a saw guide 48 which is pivoted as shown and formed with a channel-shaped saw engaging portion 49. There is also pivoted to the casting 42 as at 50 a log holding means 51 which is toothed as at 52 for the purpose as shown in Figure 9.

While I have shown and described the preferred embodiment of the invention, I desire to have it understood that such changes may be made in the form, construction, arrangement of parts and operations as will not depart from the spirit of the invention or the scope of the subjoined claims.

What is claimed is:—

1. A tool operating implement comprising a frame, guide pulleys mounted for location therein, a saw reciprocable in said frame, a casing, a rotatable crank shaft having oppositely extending throws and being journaled in the casing, flexible elements connected with the throws, a flexible tube receiving said flexible elements therethrough and extending from the casing to the frame, one of the flexible elements being trained about the pulleys arranged in the frame and connected to the forward end of the tool, and the other flexible element being directly connected to the opposite end of the tool.

2. A mechanism of the character described comprising a casing, a crank shaft journaled therein having oppositely extending throws, a motor in the casing operatively connected with the crank shaft, a flexible tube leading from the casing, a tool holder, a plurality of guide pulleys journaled in the tool holder, a pair of flexible elements connected to the throws and passing through the flexible tube, and one of said flexible elements being passed around the pulleys and connected to the forward end of the tool and the other being directly connected to the opposite end of the tool.

3. An apparatus of the character described comprising a casing, a crank shaft journaled therein and having oppositely extending throws, a motor in the casing operatively connected with the crank shaft, a flexible tube extending from the casing, a saw holder associated with the end of the flexible tube, guide pulleys journaled in the saw holder, a pair of flexible elements connected to the throws and passing through the flexible tube, and said flexible elements being associated with the pulleys for reciprocating the saw through the instrumentality of the throws, and means carried by said saw holder for controlling the operation of the saw.

In testimony whereof I affix my signature.

FELIX BJORKLUND.